Feb. 2, 1971   TAKUZO TSURUYA   3,559,506
AUTOMATIC TRANSMISSION

Filed Aug. 20, 1968   2 Sheets-Sheet 1

TAKUZO TSURUYA,
INVENTOR

BY Wenderoth, Lind & Ponack
ATTORNEYS

United States Patent Office 3,559,506
Patented Feb. 2, 1971

3,559,506
AUTOMATIC TRANSMISSION
Takuzo Tsuruya, 413 Amema, Akita-machi,
Nishi-tama-gun, Tokyo, Japan
Filed Aug. 20, 1968, Ser. No. 754,024
Int. Cl. F16h 47/08, 57/10
U.S. Cl. 74—688
2 Claims

ABSTRACT OF THE DISCLOSURE

An automatic transmission is provided with a reduction gear mechanism or mechanisms mounted on a turbine shaft of a torque converter so that a large torque can be applied to an internal gear of a planetary gear mechanism therethrough even if the input applied to the torque converter is small in magnitude. The input applied to the sun gear of the planetary gear mechanism is large in magnitude, because the sum of said inputs is constant.

This invention relates to improvements in automatic transmissions with special reference to automatic transmissions for machinery such as motor vehicles, construction equipments and the like.

In conventional automatic transmissions employing a torque converter, the maximum transmission efficiency is of the order of 85%, because of, for example, a power loss due to slip which is inevitable in the torque converter during its operation, and such transmissions are very complicated in construction.

It is therefore an object of the invention to provide an improved automatic transmission, which has a high transmission efficiency, and which is compactly constructed and easily operated.

Other objects and advantages of the invention will be apparent from the following description, taken with the accompanying drawings wherein.

Figure 1:
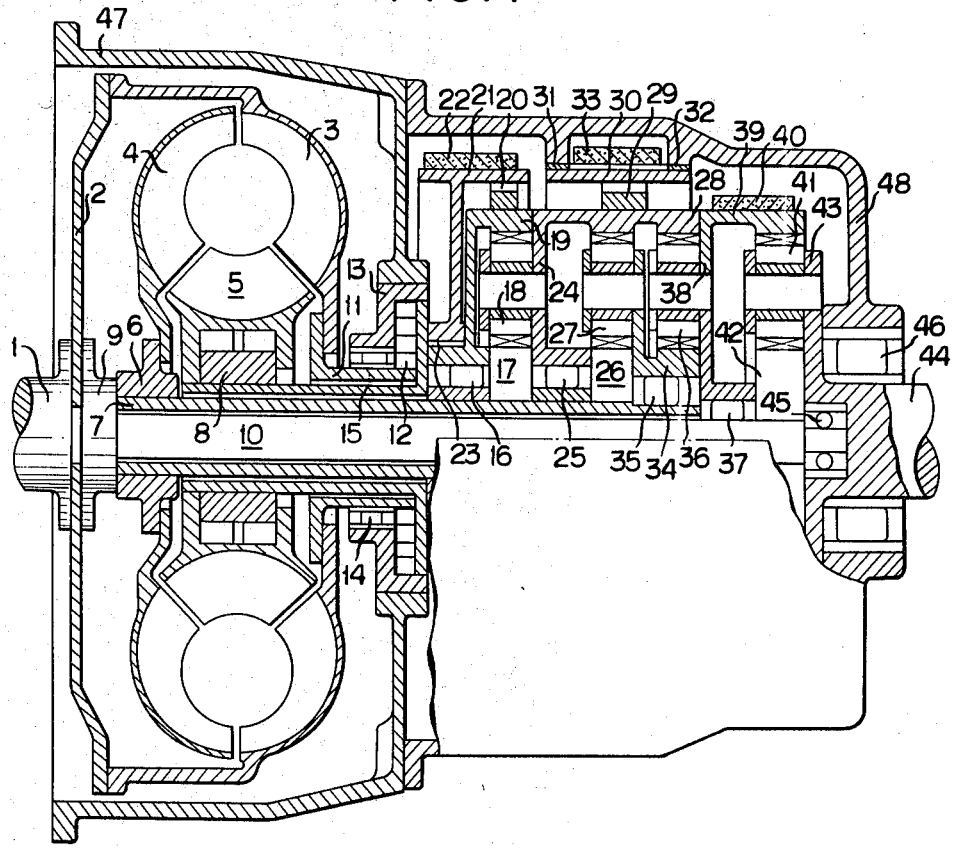
FIG. 1 is a longitudinal sectional view of one embodiment of the present automatic transmission.

Referring now to the drawings and FIG. 1 in particular, there is illustrated an automatic transmission constructed in accordance with the principle of the invention, wherein a torque converter comprises a driving shaft 1 directly connected to a prime mover (not shown), a pump 3 rotated through a driving plate 2 directly mounted for rotation on the boss portion 9 of the driving shaft 1, said driving shaft 1 being connected at 9 to an input shaft 10, a turbine 4 connected to a driven plate 6, a hollow output shaft or turbine shaft 7 of the torque converter on which the driven plate 6 is mounted for rotation, and a stator 5. The torque converter further comprises a one-way brake 8, mounted on a shaft 15 and a rotatable boss 11 connected at one end to the pump 3 and at the other end to an oil pump assembly 12. A block member 13 accommodates therein a roller bearing 14.

While it is customary that an automatic transmission contains a torque converter and a planetary gear mechanism, according to the invention the present automatic transmission further includes one or more reduction gear mechanisms—in this example, two reduction gear mechanisms, besides the planetary gear mechanism as has been contained therein. The two reduction gear mechanisms are provided between the abovementioned torque converter and the planetary gear mechanism as will be hereinafter described.

The first reduction gear mechanism in the form of a planetary gear mechanism consists of a sun gear 17 rigidly secured on the turbine shaft 7 of said torque converter, an internal gear 19 carried by a roller bearing 16, planetary pinions 18 in mesh therewith and a planet carrier 24 which is supported by a roller bearing 25 and connected to said planetary pinions 18. A one-way brake 20 is to protect the internal gear 19 from being rotated in the negative direction (hence, if a direction in which the driving shaft 1 is rotated is positive, the reverse direction is negative). A brake band 22 is disposed around the periphery of a brake drum 21 having a metal lining 23 fitted into the bore of the boss portion thereof.

The second reduction gear mechanism consists of a sun gear 26 rigidly secured on the turbine shaft 7 of said torque converter, an internal gear 28 integrally connected to the planet carrier 24 of the first reduction gear mechanism, planetary pinions 27 in mesh with said sun gear 26 and said internal gear 28, a sun gear 34 which is supported by a roller bearing 35 and acts as a planet carrier for the said planetary pinions 27, the sun gear 34 being formed with teeth on its periphery, planetary pinions 36 in mesh with said sun gear 34, and a planet carrier 38 connected to said planetary pinions 36 and supported by a roller bearing 37. A one-way brake 29 is to protect the internal gear 28 from being rotated in the negative direction. A brake band 33 is disposed around the periphery of a brake drum 30 which is supported by metal linings 31 and 32, each acting as a bearing therefor.

Figure 2:
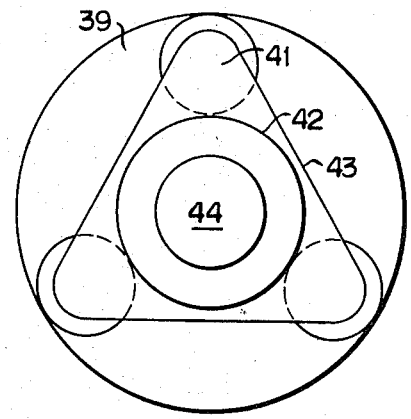
FIG. 2 is a diagrammatic view illustrating a planetary gear mechanism shown in FIG. 1.

Furthermore, the automatic transmission is provided with the above-mentioned planetary gear mechanism comprising a sun gear 42 connected to the input shaft 10, an internal gear 39 integral with the planet carrier 38, a plurality of planetary pinions 41—in this example, the three pinions each meshing with said sun gear 42 and said internal gear 39, and a planet carrier 43 connected to said three pinions 41 as best shown in FIG. 2. A brake band 40 is disposed around the periphery of the internal gear 39. An output shaft 44 integral with said planet carrier 43 is supported by a roller bearing 46, and provided with a bore in which a ball bearing 45 for the input shaft 10 is housed.

As shown in FIG. 1, said torque converter is contained in a casing 47, and said reduction gear mechanisms and planetary gear mechanism are also contained in a common casing 48.

In operation, if the turbine 4 is rotating in the positive direction, the one-way brake 20 being engaged and the one-way brake 29 being disengaged, the rotation of the driving shaft 1 is transmitted through the pump 3 and the turbine 4 to the turbine shaft 7 and further transmitted to the planet carrier 38 of the second reduction gear mechanism through the first reduction gear mechanism with reduction in train of the sun gear 17, the planetary pinions 18, the sun gear 26, the planetary pinions 27, the sun gear 34, and the planetary pinions 36. In this case a reduction ratio expressed by the number of revolutions of the turbine shaft 7 divided by the number of revolutions of the planet carrier 38 is assumed to be $\alpha$.

On the contrary, if the one-way brake 20 is disengaged and the one-way brake 29 is engaged, then the rotation of the turbine shaft 7 is transmitted to the planet carrier 38 through the second reduction gear mechanism with reduction in train of the sun gear 26, the planetary pinions 27, the sun gear 34 and the planetary pinions 36. In this case, the reduction ratio is assumed to be $\beta$.

As will be apparent from the arrangement shown in FIG. 1, if there is no external force acting on the internal gears 19 and 28 so that they can be freely rotated, the rotation of the turbine shaft 7 can be transmitted to the planet carrier 38 with no reduction. Consequently the reduction ratio is equal to 1.

Now assuming that $n'_2$ represents the number of revolutions of the internal gear 39, $b$ the number of teeth of the internal gear 39, $n_1$ the number of revolutions of the sun gear 42, $a$ the number of teeth of the sun gear 42 and $\zeta$ represents the said reduction ratios $\alpha$ or $\beta$, then the number Z of revolutions of the output shaft 44 can be expressed by the following equation $$Z=\frac{an_1+bn'_2}{a+b}=\frac{an_1+bn_2/\zeta}{a+b}$$

wherein $n_2$ represents the number of revolutions of the turbine shaft 7. In this automatic transmission, power can be transmitted from the prime mover to the torque converter and to the sun gear 42 through the input shaft 10 in the same manner as in the conventional automatic transmission, and of course a torque applied to the output shaft 44 can be automatically changed in accordance with a load thereon. The turbine 4 can be rotated in the negative direction, although the conventional transmission is not intended to reverse its turbine positively. Therefore, it is possible to rotate the turbine shaft 7 at $$n_2=-\frac{a}{b}\zeta n_1$$

and accordingly to hold the output shaft 44 stationary as will be apparent from the equation. Thus, according to the present invention, the output shaft 44 can be changed in speed from zero.

Since the automatic transmission of the present invention has the foregoing function, and when the sun gear and the internal gear rotate in the positive direction the reduction gear mechanisms mounted on the turbine shaft 7 have the effect of transmitting a larger torque to the internal gear 39 therethrough although a torque applied thereto is small in magnitude due to the nature of the planetary gear mechanism with respect to the sun gear torque and the internal gear torque (that is, $T_1/T_2$=const., wherein $T_1$ represents sun gear torque, and $T_2$ internal gear torque), the transmission efficiency thereof can be improved compared with conventional transmissions. In addition it is possible to divide the power from the prime mover into two parts, the smaller one of which is transmitted to the torque converter having a low transmission efficiency, and the larger one of which is transmitted to the gear drive mechanism having a high transmission efficiency, which comprises the input shaft 10 and the sun gear 42.

When the output shaft 44 has applied thereto a large load, the carrier 43 is stopped by the nature of the planetary gear mechanism if there is no torque acting on the internal gear 39. Therefore, power from the sun gear 42 is transmitted to the internal gear 39 and causes the latter to be rotated in a direction opposed to that of the input shaft 1 (i.e. in the negative direction) as understood from the above equation. This reverse rotation of the internal gear 39 can be transmitted to the turbine shaft 4 because of the absence of a one-way brake between the turbine shaft and the turbine, with the result that the turbine 4 has applied thereto torque resulting from the frictional resistance developed in the fluid between the pump 3 and the turbine 4. The said torque applied to the turbine 4 can be transmitted through the turbine shaft 7, etc. to the internal gear 39 and tends to prevent the latter from being rotated in the negative direction. Under such conditions, the internal gear 39 changes in speed according to the magnitude of the said torque applied thereto and the carrier 43 begins to rotate in the same direction as that of the input shaft 1. Due to the nature of the planetary gear mechanism, torque on the internal gear changes in magnitude according to the load applied to the output shaft 44, but the speed of the internal gear 39 increases or decreases with the decrease or increase of the torque applied to the internal gear 39. Therefore, when the load on the output shaft is decreased, the direction of rotation of the internal gear changes from negative to positive. The power consumed to rotate the turbine 4 in the reverse direction is a loss of this transmission, but it will be understood from the foregoing that the larger the reduction ratio is, the smaller will be the loss, thereby resulting in the automatic transmission having a high efficiency.

From the foregoing, it will be readily understood that the above advantage can be obtained only by providing one or more reduction gear mechanisms on the turbine shaft 7, and the output shaft 44 can be stepped down or up in speed, as will be apparent from the foregoing equation, by a change-over of the reduction ratio $\zeta$ of the reduction gear mechanisms. The change-over of the reduction ratio is performed in the manner hereinafter explained.

It is found by our experiment that, in a low speed range, i.e. when the speed ratio between the sun gear 42 and the output shaft 44 is comparatively small, the internal gear 39 changes its direction of rotation from negative to positive. Therefore, as long as the internal gear 39 is rotated in the negative direction, the one-way brake 20 is disengaged and the brake 29 is engaged and hence the turbine shaft 7 is decelerated at the larger reduction ratio of $\beta$. In a middle range speed ratio wherein the one-way brake 20 is engaged, the internal gear 28 is rotated in the positive direction because of the sun gear 17, the planetary pinions 18 and the internal gear 19, so that the one-way brake 29 is disengaged. Hence, the rotation of the turbine shaft 7 can be transmitted to the planet carrier 38 with reduction in the train of the sun gear 17, the planetary pinions 18 and the internal gear 19 etc. During this time, the reduction ratio is $\alpha$. Further, when a certain speed ratio exists above a predetermined ratio between the output shaft 44 and the driving shaft 1, there is developed a difference in pressure between the oil pump 12 and another oil pump (not shown) mounted on the output shaft 44. This difference causes the brake band 22 to loosen and therefore the one-way brake 20 to be disengaged. This allows the rotation of the turbine shaft 7 to be transmitted to the planet carrier 38 with no reduction, i.e., the reduction ratio is 1.

Figure 3:
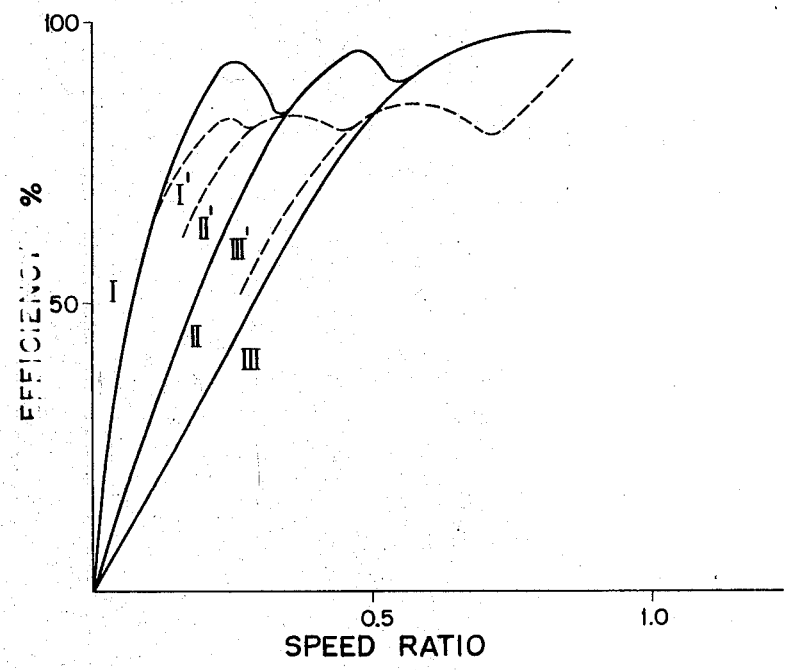
FIG. 3 shows performance curves of the automatic transmission shown in FIG. 1 and of a conventional transmission.

Referring now to FIG. 3, there are shown performance curves of the automatic transmission of the present invention under the conditions that $a=16$, $b=40$ and $\zeta=8$, 3 or 1, wherein the curves I, II and III correspond to $\zeta=8$ ($\beta$), 3 ($\alpha$) and 1, respectively. The curves I', II' and III' are those of the conventional transmission. By comparing the curves, it will be seen that the automatic transmission of the invention is greatly improved in efficiency.

Figure 4:
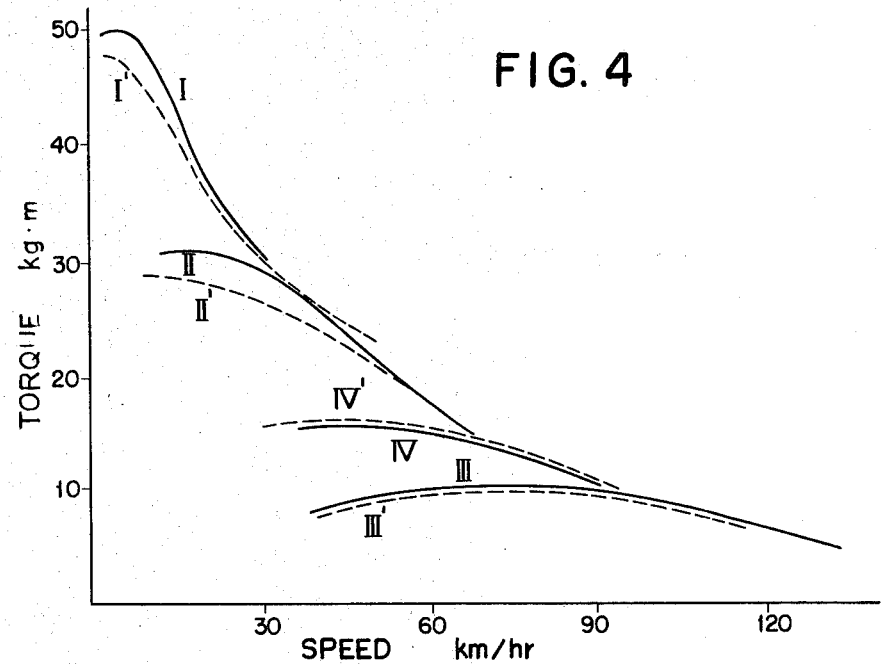
FIG. 4 is a diagram showing the relation between torque and speed obtained by said transmissions.

Referring now to FIG. 4, there is shown a torque diagram, in which the curves I, II, III, I', II' and III' correspond to those of FIG. 3, and the curves IV and IV' show torques when the torque converters are rotating at the speed ratio of about 0.8 or more, because at this time each of the torque converters provided with the one-way brakes automatically form a fluid coupling. It will be also apparent that the automatic transmission of the present invention is superior to the conventional transmission in the production of output torque particularly at low and middle speed ratios.

Besides having the above-mentioned advantages, the present invention has the following further advantages:

(1) A sudden increase in speed of the output shaft 44 is accompanied by an increase in the number of revolutions of the internal gear 39 and the sun gear 42, and hence the input shaft 10. This causes the prime mover to exhibit an engine braking effect. Also, the brake band 40 clamps against the internal gear 39 and the input shaft 10 abruptly increases in speed so that a strong engine brake is applied.

(2) When a vehicle equipped with this automatic transmission stops temporarily, the output shaft 44 is held stationary so that power is transmitted from the input shaft 10 to the internal gear 28 through the planetary pinions 41 and the planet carrier 38, which rotate in the direction opposed to that of the input shaft 10. If the brake band 33 is released under such a condition, the power is further transmitted to the planet carrier 24, which is also rotated in the same direction. Since the internal gear 19 is in this case rotated idly in the negative direction, there is no need for the prime mover to generate a large amount of power. Therefore, it will be apparent that, in the present automatic transmission provided with the brake band 33, the power loss in the torque converter may be reduced. This results in the advantage that the rise of the oil-temperature in the torque converter is less than in the conventional automatic transmission. If the vehicle is started with the brake 40 engaged the vehicle is allowed to start at a comparatively low speed even if the engine is rotated at a comparatively high speed. This means that there is no need to start the vehicle at a high speed as with vehicles heretofore in use.

(3) In case the engine is stopped for any reason, if the brake 40 is engaged and then the starter is rotated, the vehicle can travel for a short distance. (In general, a vehicle equipped with a conventional transmission can not travel by itself.)

Obviously, the automatic transmission of the present invention thus far described is simplified in construction and improved in transmission efficiency over a wide range of speeds, so that the invention has a very wide application for industry.

While the invention has been illustrated and described with reference to a single preferred embodiment thereof, it is to be understood that various changes in the details of construction and the arrangement and combination of parts may be resorted to without departing from the spirit and scope of the invention.

What I claim is:

1. An automatic three forward speed transmission for changing over between a low, a middle and a high gear, comprising,
  (a) a first planetary gear mechanism having a sun gear, an internal gear, a plurality of planet gears and a planet carrier;
  (b) an input shaft means connected at one end thereof to a prime mover and at the other end thereof to said sun gear of said first planetary gear mechanism for transmitting torque from said prime mover to said sun gear;
  (c) an output shaft means connected to said planet carrier of said first planetary gear mechanism;
  (d) a torque converter having a pump driven by said input shaft means and a turbine rotatable in a direction opposite to that of said pump;
  (e) a second and a third selectively operable planetary gear mechanisms connected between said turbine and said internal gear of said first planetary gear mechanism for transmitting torque to said internal gear of said first planetary gear mechanism, said second and third planetary gear mechanisms transmitting to said turbine a reverse rotation of said internal gear of said first planetary gear mechanism due to a counter torque produced thereon when said output shaft means is applied thereto a load sufficient to reverse said internal gear, and each of said second and third planetary gear mechanisms having an internal gear;
  (f) a first one-way brake means preventing said internal gear of said second planetary gear mechanism from being rotated in a direction opposite to that of said input shaft means;
  (g) a second one-way brake means preventing said internal gear of said third planetary gear mechanism from being rotated in a direction opposite to that of said input shaft means; and
  (h) a brake means cooperating with said first one-way brake means for holding and releasing said first one-way brake means, said brake means being disengaged at a speed where said transmission is changed over from the middle to the high gear, whereby said transmission is changed over from the low to the middle gear and vice versa when said internal gear of said first planetary gear mechanism is reversed, and from the middle to the high gear or vice versa when said brake means is disengaged or engaged and whereby said torques transmitted to said first planetary gear mechanism are combined to produce the output of said transmission.

2. An automatic three forward speed transmission as set forth in claim 1, comprising a second brake means cooperating with said second one-way brake means for holding and releasing said second one-way brake means.

References Cited

UNITED STATES PATENTS

| | | | |
|---|---|---|---|
| 2,448,249 | 8/1948 | Bonham | 74—688 |
| 2,704,468 | 3/1955 | Horton et al. | 74—688 |
| 3,426,618 | 2/1969 | Hau | 74—688 |
| 2,959,984 | 11/1960 | Wickman | 74—688 |
| 3,099,171 | 7/1963 | Ivanchick | 74—688 |
| 3,188,887 | 6/1965 | Gabriel | 74—688 |
| 3,426,617 | 2/1969 | Tosi | 74—688 |

ARTHUR T. McKEON, Primary Examiner

U.S. Cl. X.R.

74—765